(12) United States Patent
Cha et al.

(10) Patent No.: US 11,158,458 B2
(45) Date of Patent: Oct. 26, 2021

(54) MULTI-LAYERED CERAMIC ELECTRONIC COMPONENT AND MANUFACTURING METHOD THEREOF

(71) Applicant: SAMSUNG ELECTRO-MECHANICS CO., LTD., Suwon-si (KR)

(72) Inventors: Kyoung Jin Cha, Suwon-si (KR); Hyun Soo Oh, Suwon-si (KR); Woo Chul Shin, Suwon-si (KR); Hye Ji Jang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 3 days.

(21) Appl. No.: 16/680,995

(22) Filed: Nov. 12, 2019

(65) Prior Publication Data

US 2021/0027943 A1    Jan. 28, 2021

(30) Foreign Application Priority Data

Jul. 22, 2019  (KR) .......................... 10-2019-0088300

(51) Int. Cl.
| | |
|---|---|
| *H01G 4/12* | (2006.01) |
| *H01G 4/012* | (2006.01) |
| *H01G 4/232* | (2006.01) |
| *H01G 4/30* | (2006.01) |

(52) U.S. Cl.
CPC .......... *H01G 4/1218* (2013.01); *H01G 4/012* (2013.01); *H01G 4/232* (2013.01); *H01G 4/306* (2013.01)

(58) Field of Classification Search
None
See application file for complete search history.

(56) References Cited

U.S. PATENT DOCUMENTS

| | | | |
|---|---|---|---|
| 6,320,738 B1 | 11/2001 | Yamana et al. | |
| 2013/0027839 A1* | 1/2013 | Kim | H01G 4/30 361/301.4 |
| 2014/0009864 A1* | 1/2014 | Takashima | C04B 35/4682 361/301.4 |
| 2018/0082789 A1* | 3/2018 | Asano | H01G 4/232 |
| 2018/0090273 A1* | 3/2018 | Hwang | H01G 4/248 |
| 2019/0385794 A1* | 12/2019 | Yanagisawa | H01G 4/1245 |
| 2020/0335279 A1* | 10/2020 | Jiayin | B22F 1/0048 |
| 2021/0035740 A1* | 2/2021 | Kim | H01G 4/1218 |

FOREIGN PATENT DOCUMENTS

| | | |
|---|---|---|
| JP | 2003-178926 A | 6/2003 |
| JP | 2004-79994 A | 3/2004 |
| KR | 10-2013-0013437 A | 2/2013 |

* cited by examiner

*Primary Examiner* — Dion Ferguson
(74) *Attorney, Agent, or Firm* — Morgan, Lewis & Bockius LLP

(57) ABSTRACT

A multilayer ceramic electronic component includes a ceramic body including first and second internal electrodes disposed to face each other and a dielectric layer interposed therebetween. When an average thickness of the dielectric layer is denoted as 'td,' an average thickness of the first and second internal electrodes is denoted as 'te,' and a standard deviation of thicknesses of an internal electrode, measured at a plurality of points in a predetermined region of the internal electrode, is denoted as 'σte,' a ratio of the standard deviation of thicknesses of the internal electrode to the average thickness of the dielectric layer, which is denoted as 'σte/td,' satisfies $0.12 \leq \sigma te/td \leq 0.21$.

10 Claims, 2 Drawing Sheets

MULTI-LAYERED CERAMIC ELECTRONIC COMPONENT AND MANUFACTURING METHOD THEREOF

CROSS-REFERENCE TO RELATED APPLICATION(S)

The present application claims the benefit of priority to Korean Patent Application No. 10-2019-0088300 filed on Jul. 22, 2019 in the Korean Intellectual Property Office, the entire disclosure of which is incorporated herein by reference.

TECHNICAL FIELD

The present disclosure relates to a multilayer ceramic electronic component, and more particularly, to a multilayer ceramic electronic component having excellent reliability and a manufacturing method thereof.

BACKGROUND

Generally, electronic components using ceramic materials such as capacitors, inductors, piezoelectric devices, varistors, thermistors, or the like, may include a ceramic body formed of a ceramic material, internal electrodes formed inside the ceramic body, and external electrodes installed on a surface of the ceramic body so as to be connected to the internal electrodes.

Among multilayer ceramic electronic components, a multilayer ceramic capacitor includes a plurality of stacked dielectric layers, internal electrodes disposed to oppose each other with a dielectric layer interposed therebetween, and external electrodes electrically connected to the internal electrodes.

Multilayer ceramic capacitors are widely used as components of mobile communication devices such as computers, PDAs, and mobile phones due to their small size, high capacity, and ease of mounting.

In recent years, due to high performance and the lightness and smallness of electronic device industries, the miniaturization, high performance, and high capacity of electronic components are also required.

In particular, a method of simultaneously achieving small size, high performance, and high capacity is to laminate a large number of layers by reducing the thicknesses of the dielectric layer and the internal electrode layer of the multilayer ceramic capacitor. At present, the thickness of the dielectric layer has reached a level of about 0.6 µm, and thinning continues.

Therefore, although a contact ratio of an interface between the internal electrode and the dielectric continues to increase, there may be a problem in that a region in which metal and ceramic are bonded has a low bonding force and thus is vulnerable to delamination and cracking.

The delamination and cracking lead to deterioration of moisture resistance reliability of the multilayer ceramic capacitor, and thus, a new method for securing high reliability in terms of materials or structures to solve such problems.

The information included in this Background section is only for enhancement of understanding of the general background of the present disclosure and may not be taken as an acknowledgment or any form of suggestion that this information forms the prior art already known to a person skilled in the art.

SUMMARY

The present disclosure relates to a multilayer ceramic electronic component and a manufacturing method thereof, and more particularly, relates to a multilayer ceramic electronic component and a manufacturing method thereof having excellent reliability.

According to an aspect of the present disclosure, a multilayer ceramic electronic component includes a ceramic body including first and second internal electrodes disposed to face each other and a dielectric layer interposed therebetween, wherein, when an average thickness of the dielectric layer is denoted as 'td,' an average thickness of the first and second internal electrodes is denoted as 'te,' and a standard deviation of thicknesses of an internal electrode, measured at a plurality of points in a predetermined region of the internal electrode, is denoted as 'σte,' a ratio of the standard deviation of thicknesses of the internal electrode to the average thickness of the dielectric layer, which is denoted as 'σte/td,' satisfies $0.12 \leq \sigma te/td \leq 0.21$.

According to another aspect of the present disclosure, a manufacturing method of a multilayer ceramic electronic component includes steps of: preparing ceramic green sheets each containing ceramic powder; forming an internal electrode pattern with a conductive paste, containing conductive metal particles, and an additive on each ceramic green sheet; stacking the ceramic green sheets, on each of which the internal electrode pattern is formed, to form a ceramic laminate; and firing the ceramic laminate to form a ceramic body, which includes at least one dielectric layer and at least one internal electrode. When an average thickness of the at least one dielectric layer is denoted as 'td,' an average thickness of the at least one internal electrode is denoted as 'te,' and a standard deviation of thicknesses of an internal electrode, measured at a plurality of points in a predetermined region of the internal electrode, is denoted as 'σte,' a ratio of the standard deviation of thicknesses of the internal electrode to the average thickness of the dielectric layer, which is denoted as 'σte/td,' satisfies $0.12 \leq \sigma te/td \leq 0.21$.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
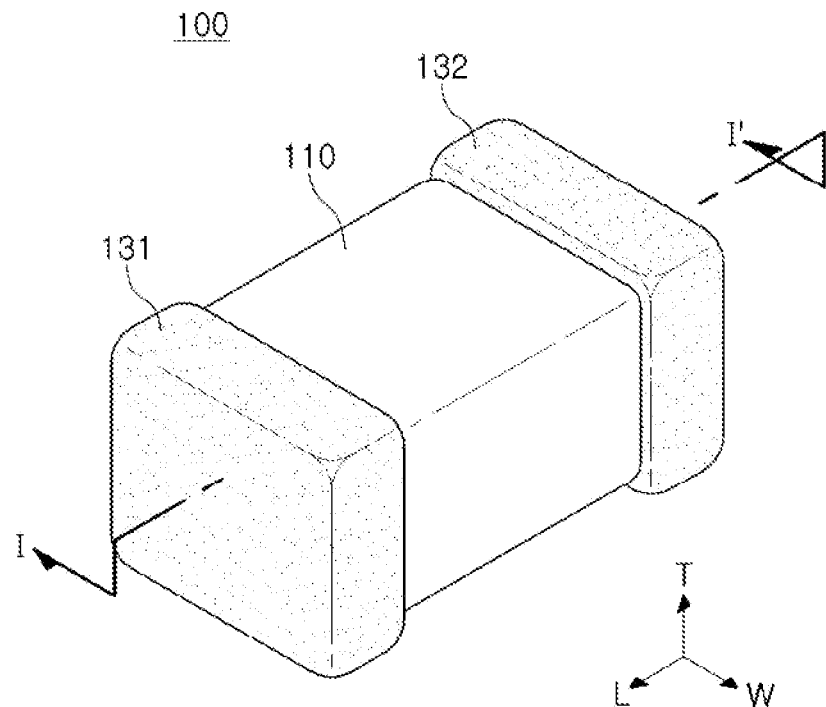
FIG. 1 is a schematic perspective view illustrating a multilayer ceramic capacitor according to an exemplary embodiment of the present disclosure.

Hereinafter, exemplary embodiments of the present disclosure will now be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

An embodiment of the present disclosure relates to a ceramic electronic component. The electronic component using the ceramic material includes a capacitor, an inductor, a piezoelectric element, a varistor, a thermistor, or the like. Hereinafter, a multilayer ceramic capacitor will be described as an example of the ceramic electronic component.

FIG. 1 is a schematic perspective view illustrating a multilayer ceramic capacitor according to an exemplary embodiment of the present disclosure.

Figure 2:
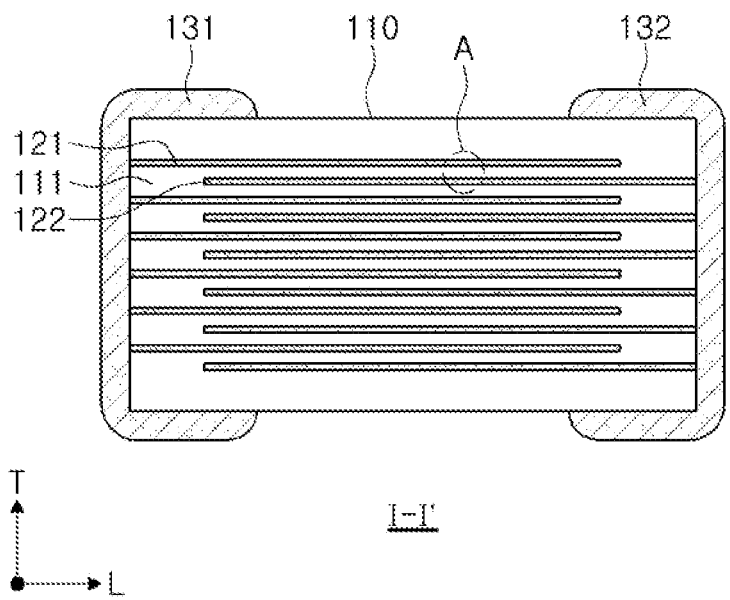
FIG. 2 is a schematic cross-sectional view illustrating a multilayer ceramic capacitor taken along line I-I' of FIG. 1.

FIG. 2 is a schematic cross-sectional view illustrating a multilayer ceramic capacitor taken along line I-I' of FIG. 1.

Figure 3:
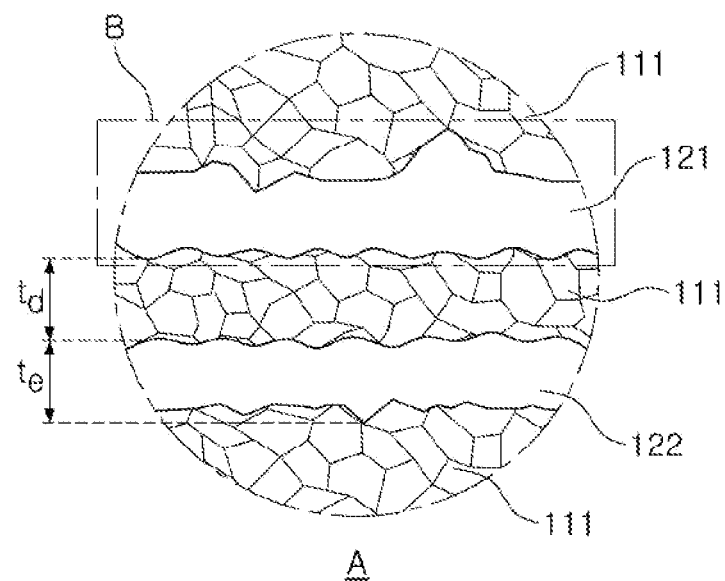
FIG. 3 is an enlarged view of region A of FIG. 2.

FIG. 3 is an enlarged view of region A of FIG. 2.

Figure 4:
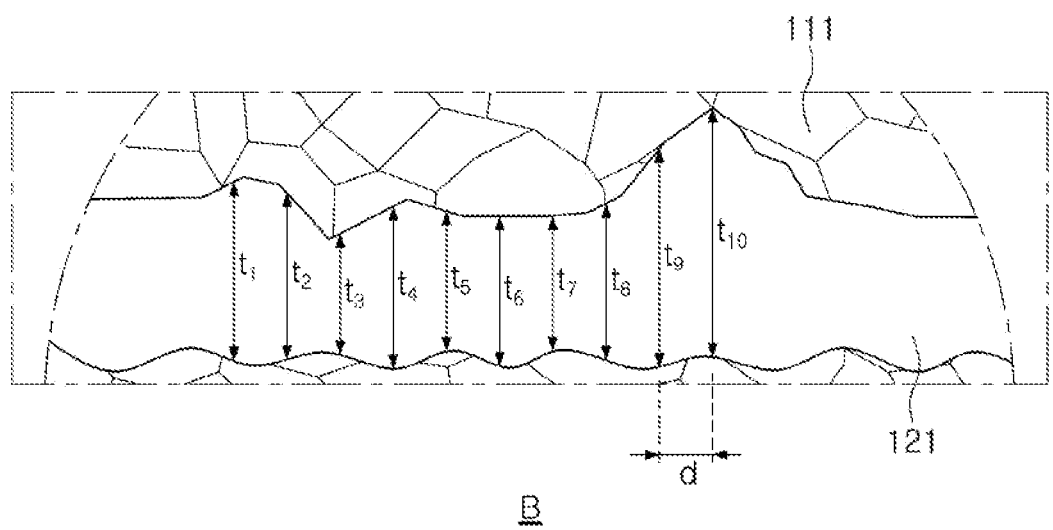
FIG. 4 is an enlarged view of region B of FIG. 3.

FIG. 4 is an enlarged view of region B of FIG. 3.

Referring to FIGS. 1 to 4, a multilayer ceramic capacitor according to an exemplary embodiment of the present disclosure may include a ceramic body 110, which includes internal electrodes 121 and 122 arranged inside the ceramic body, and external electrodes 131 and 132 arranged outside of the ceramic body 110.

In the multilayer ceramic capacitor according to an exemplary embodiment of the present disclosure, a 'length direction' may be defined as a 'L' direction, a 'width direction' may be defined as a 'W' direction, and a 'thickness direction' may be defined as 'T' direction, of FIG. 1. The 'thickness direction' may be used to have the same concept as a direction in which dielectric layers are stacked, that is, a 'stacking direction'.

The ceramic body 110 is not particularly limited in shape, but the ceramic body 110 may have a hexahedral shape according to an exemplary embodiment of the present disclosure.

The ceramic body 110 may be formed by laminating a plurality of dielectric layers 111.

The plurality of dielectric layers 111 constituting the ceramic body 110 are in a sintered state, and the dielectric layers 111 may be integrated with each other such that it may be difficult to identify boundaries between adjacent dielectric layers 111 with the naked eye.

The dielectric layer 111 may be formed by sintering a ceramic green sheet including ceramic powder.

The ceramic powder is not particularly limited as long as it is generally used in the art.

Although not limited thereto, the ceramic powder may include $BaTiO_3$-based ceramic powder.

The $BaTiO_3$-based ceramic powder is not limited thereto, and the $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like is partially dissolved in $BaTiO_3$.

In addition, the ceramic green sheet may include a transition metal, a rare earth element, Mg, and Al together with the ceramic powder.

The thickness of the dielectric layer 111 may be appropriately changed according to capacitance design of the multilayer ceramic capacitor.

Although not limited thereto, for example, the thickness of the dielectric layer 111 formed between two adjacent internal electrode layers after sintering may be 0.4 μm or less.

In an exemplary embodiment of the present disclosure, the thickness of the dielectric layer 111 may mean an average thickness.

The average thickness of the dielectric layer 111 is an average thickness of the ceramic body 110 in length-thickness (L-T) direction cross-section cut in a central portion in a width W direction thereof.

The average thickness of the dielectric layer 111 may be measured by scanning an image of the ceramic body 110 in the length direction cross-section with a scanning electron microscope (SEM), as illustrated in FIG. 2.

For example, with regard to an arbitrary dielectric layer extracted from the image obtained by scanning the length-thickness (L-T) direction cross-section of the ceramic body 110 cut in a central portion in the width W direction thereof with a scanning electron microscope (SEM), an average value of the dielectric layer may be measured by measuring the thickness thereof at 30 points having equal intervals in the length direction.

The 30 points having equal intervals may be measured at the capacitance formation portion, meaning a region in which the internal electrodes 121 and 122 overlap each other.

In addition, when the average value is measured by extending an average value measurement to 10 or more dielectric layers, an average thickness of the dielectric layer may be further generalized.

Internal electrodes 121 and 122 may be disposed inside the ceramic body 110.

The internal electrodes 121 and 122 may be formed and stacked on the ceramic green sheet, and may be formed in the ceramic body 110 with one dielectric layer interposed therebetween by sintering.

The internal electrode may be paired with the first internal electrode 121 and the second internal electrode 122, having different polarities, and may be disposed to oppose each other in a stacking direction of the dielectric layer.

As illustrated in FIG. 2, ends of the first and second internal electrodes 121 and 122 may be alternately exposed to one surface of the ceramic body 110 in the length direction.

In addition, although not illustrated, according to an exemplary embodiment of the present disclosure, the first and second internal electrodes may have lead portions, and may be exposed to the same surface of the ceramic body through the lead portions. Alternately, the first and second internal electrodes may have lead portions, and may be exposed to one or more surfaces of the ceramic body through the lead portions.

Thicknesses of the first and second internal electrodes 121 and 122 are not particularly limited, but may be, for example, 0.41 μm or less.

According to an exemplary embodiment of the present disclosure, more than 200 dielectric layers having internal electrodes formed thereon may be stacked.

According to an exemplary embodiment of the present disclosure, when the thicknesses of the first and second internal electrodes 121 and 122 are 0.41 μm or less, moisture resistance reliability may be improved, and in the case of thin-film internal electrodes, a characteristic configuration having excellent withstand voltage characteristics may be proposed. When the thicknesses of the first and second internal electrodes 121 and 122 exceed 0.41 μm, the capacity problem and the reliability deterioration may not occur, even if the characteristic configuration of the present disclosure is not applied.

That is, the characteristic configuration of the present disclosure described below may be applied to improve reliability when the thicknesses of the first and second internal electrodes 121 and 122 are 0.41 μm or less.

The average thickness of the first and second internal electrodes 121 and 122 are average thickness in the cross-section of the length-thickness (L-T) direction cross-section of the ceramic body 110 cut in a central portion in the width W direction thereof.

According to an exemplary embodiment of the present disclosure, external electrodes 131 and 132 may be formed outside of the ceramic body 110, and the external electrodes 131 and 132 may be electrically connected to the internal electrodes 121 and 122.

More specifically, the external electrodes 131 and 132 may be configured as the first external electrode 131 electrically connected to the first internal electrode 121 exposed to one surface of the ceramic body 110 and the second external electrode 132 electrically connected to the second internal electrode 122 exposed to the other surface of the ceramic body 110.

In addition, a plurality of external electrodes to be connected to the first and second internal electrodes exposed to the ceramic body may be formed.

The external electrodes 131 and 132 may be formed of a conductive paste containing metal powder.

The metal powder contained in the conductive paste is not particularly limited, and may be, for example, Ni, Cu, or alloys thereof.

The thicknesses of the external electrodes 131 and 132 may be appropriately determined depending on a purpose, or the like, for example, may be in a range of, for example, 10 µm to 50 µm.

Referring to FIGS. 3 and 4, in a multilayer ceramic electronic component according to an exemplary embodiment of the present disclosure, when an average thickness of the dielectric layer 111 is td, an average thickness of the first and second internal electrodes 121 and 122 is te, a standard deviation of thicknesses of an internal electrode of the first and second internal electrodes 121 and 122, measured at a plurality of points in a predetermined region of the internal electrode, is denoted as '$\sigma te$,' a ratio of the standard deviation of thicknesses of the internal electrode to the average thickness of the dielectric layer 111, which is denoted as '$\sigma te/td$,' satisfies $0.12 \leq \sigma te/td \leq 0.21$.

In recent years, in high-capacity, highly-stacked multilayer ceramic capacitors, most of the moisture resistance reliability deterioration are mainly caused by delamination and cracking due to weakening of the bonding force between the metal and the ceramic at an interface between the internal electrode and the dielectric.

In order to solve the problem of deterioration in moisture resistance reliability of the multilayer ceramic capacitor, it is necessary to increase an interfacial bonding force between the internal electrode and the dielectric. To this end, when an interfacial bonding area is increased, the problem of deterioration in moisture resistance may be solved.

In addition, it is possible to increase the interfacial bonding are between the internal electrode and the dielectric by finely adjusting roughness of the internal electrode.

However, if a roughness profile of the internal electrode is excessively adjusted, a side effect of reducing withstand voltage characteristics of the multilayer ceramic capacitor may occur. Therefore, it is necessary to appropriately adjust roughness of the internal electrode to improve the withstand voltage in addition to improving the moisture resistance reliability.

According to an exemplary embodiment of the present disclosure, the ratio ($\sigma te/td$) of the standard deviation of thicknesses of the internal electrodes 121 and 122 to the thickness of the dielectric layer 111 is adjusted to satisfy $0.12 \leq \sigma te/td \leq 0.21$. Thus, moisture resistance reliability may be improved by increasing the chip strength, and a multilayer ceramic electronic component having excellent withstand voltage characteristics may be realized.

When the ratio ($\sigma te/td$) of the standard deviation of thicknesses of the internal electrodes 121 and 122 to the thickness of the dielectric layer 111 is less than 0.12, the withstand voltage characteristics are excellent, but deterioration in moisture resistance reliability as the chip strength is lowered, may be a problem.

Meanwhile, when the ratio ($\sigma te/td$) of the thickness of each position of the internal electrodes 121 and 122 to the thickness of the dielectric layer 111 exceeds 0.21, the chip strength is high and the moisture resistance reliability is not a problem, but the withstand voltage characteristics are lowered, which may cause reliability problems.

The thicknesses for the $\sigma te$ are measured in at least points of the predetermined region of the internal electrode, having a size of 20 µm×14 µm, in a length-thickness direction (L-T) cross-section of the ceramic body 110, and the at least 10 points have intervals of 10 nm or less.

Specifically, the standard deviation $\sigma te$ of thicknesses of the internal electrodes 121 and 122 may be measured by scanning an image of a length-thickness direction cross-section of the ceramic body 110 with a scanning electron microscope(SEM), as shown in FIG. 2.

For example, as shown in FIG. 2, with regard to one internal electrode 121 extracted from an image obtained by scanning the length-thickness (L-T) direction cross-section cut in a central portion of the ceramic body 110 in the width W direction with a scanning electron microscope (SEM), an average value may be calculated by measuring the thicknesses $t_1$ to $t_{10}$ thereof at 10 points having equal intervals in the length direction.

The equal interval may be measured by measuring the thicknesses $t_1$ to $t_{10}$ thereof at 10 points at intervals (d) of 10 nm or less, and may be measured in the capacitance formation portion, meaning a region in which the internal electrodes 121 and 122 overlap each other.

In an exemplary embodiment of the present disclosure, with regard to one internal electrode 121, the interval having equal intervals (d) is 10 nm, and the thicknesses $t_1$ to $t_{10}$ were measured at 10 points, but the present disclosure is not limited thereto. The equal interval may be 10 nm or less, and the thickness of each position of the internal electrode may be measured at 10 or more points.

Next, in order to obtain the standard deviation ($\sigma te$) of thicknesses of the internal electrodes 121 and 122, variance may be obtained by subtracting the average value to of the respective thicknesses $t_1$ to $t_{10}$ measured at 10 points of the one internal electrode 121 and the thickness of the internal electrode and then squared, and calculating the average value of these values.

Finally, the standard deviation ($\sigma te$) of the thicknesses $t_1$ to $t_{10}$, measured at 10 points of the one internal electrode 121 may be calculated by performing a square root of the variance value.

The standard deviation $\sigma te$ of the thicknesses $t_1$ to $t_{10}$ of the internal electrodes 121 and 122 is an index indicating an extent to which the respective thicknesses of the internal electrodes are separated from the average thickness of the internal electrodes as described above, and it is different from Ra, so-called an average roughness at a center line.

That is, Ra, which is the average roughness of a center line, is a value obtained by dividing the sum of areas of difference parts by a surface roughness based on a virtual center line in an actual shape of one interface of the internal electrode by a predetermined length, and it has a definition different from the standard deviation of thicknesses of the internal electrode according to an exemplary embodiment of the present disclosure, and there is a difference in the measured values.

According to an exemplary embodiment of the present disclosure, by appropriately adjusting the standard deviation of thicknesses of the internal electrode, it is possible to prevent deterioration in moisture resistance reliability and to improve withstand voltage characteristics.

That is, by finely adjusting the roughness of the internal electrode, the interfacial bonding area between the internal electrode and the dielectric may be increased, and the roughness of the internal electrode may not be excessively increased, thereby improving the withstand voltage characteristics of the multilayer ceramic capacitor.

A multilayer ceramic capacitor 100 according to an exemplary embodiment of the present disclosure is an ultra compact-sized high-capacity product, and the thickness of the dielectric layer 111 may be 0.4 µm or less, and the thicknesses of the first and second internal electrodes 121 and 122 may be 0.41 µm or less, but is not necessarily limited thereto.

That is, since the multilayer ceramic capacitor 100 according to the present embodiment is an ultra compact-sized high-capacity product, the thicknesses of the dielectric layer 111 and the first and second internal electrodes 121 and 122 are made of a thin film compared to the conventional product. As described above, in the case of a product to which a thin film dielectric layer and an internal electrode are applied, a problem of deterioration in reliability caused by shrinkage in the thickness direction generated during the firing process of the internal electrode is an important issue.

That is, since the conventional multilayer ceramic capacitor has a relatively thicker thickness than the dielectric layer and the internal electrode included in the multilayer ceramic capacitor according to an exemplary embodiment of the present disclosure, reliability deterioration according to the thickness direction shrinkage that is generated in the firing process of the internal electrode was not a big problem.

However, in a product to which a thin film dielectric layer and an internal electrode are applied as an exemplary embodiment of the present disclosure, it is necessary to control of the interfacial bonding force between the internal electrode and the dielectric layer to improve reliability.

In order to increase the interfacial bonding force between the internal electrode and the dielectric layer, a method of increasing the interfacial bonding area between the internal electrode and the dielectric is required, and the roughness of the internal electrode may be finely adjusted in order to increase a bonding area.

However, when a roughness profile of the internal electrode is excessively adjusted, a side effect reducing the withstand voltage characteristics of the multilayer ceramic capacitor may occur. Therefore, it is necessary to appropriately adjust the roughness of the internal electrode to improve the withstand voltage in addition to improving moisture resistance reliability.

Therefore, it is necessary to appropriately adjust the roughness of the internal electrodes in the product to which the thin film dielectric layer and the internal electrodes are applied, in which the dielectric layer 111 has a thickness of 0.4 µm or less and the first and second internal electrodes 121 and 122 have a thickness of 0.41 µm or less.

That is, in an exemplary embodiment of the present disclosure, the ratio ($\sigma te/td$) of the standard deviation of thicknesses of the internal electrodes 121 and 122 to the thickness of the dielectric layer 111 is adjusted to satisfy $0.12 \leq \sigma te/td \leq 0.21$. After firing, even in the case of the thin film dielectric layer having the thickness of the dielectric layer is 0.4 µm or less and the thicknesses of the first and second internal electrodes 121 and 122 are 0.41 µm or less, the moisture resistance reliability may be improved by increasing the chip strength, and the multilayer ceramic electronic component having excellent withstand voltage characteristics may be realized.

However, the meaning of the thin film does not mean that the thicknesses of the dielectric layer 111 and the first and second internal electrodes 121 and 122 are 0.4 µm and 0.41 µm or less, respectively, and it may be understood as a concept including a dielectric layer and an internal electrode having a thickness thinner than that of the conventional product.

Hereinafter, a method of manufacturing a multilayer ceramic capacitor for implementing a feature portion of the present disclosure will be described in more detail.

According to an exemplary embodiment of the present disclosure, a method of manufacturing a multilayer ceramic electronic component includes steps of: preparing a ceramic green sheet containing ceramic powder; forming an internal electrode pattern with a conductive paste containing conductive metal particles and an additive on the ceramic green sheet; stacking a ceramic green sheet on which the internal electrode pattern is formed to form a ceramic laminate; and firing the ceramic laminate to form a ceramic body including a dielectric layer and an internal electrode. A ratio ($\sigma te/td$) of standard deviation of thicknesses of the internal electrodes to the thickness of the dielectric layer satisfies $0.12 \leq \sigma te/td \leq 0.21$.

According to an exemplary embodiment of the present disclosure, a plurality of ceramic green sheets may be provided.

The ceramic green sheet may be prepared by mixing ceramic powder, a binder, a solvent, and the like to prepare a slurry, and the slurry may be prepared in a sheet form having a thickness of several µms by a doctor blade method. The ceramic green sheet may then be sintered to form one dielectric layer 111 as illustrated in FIG. 2.

The thickness of the ceramic green sheet may be 0.6 µm or less, and thus, the thickness of the dielectric layer after firing may be 0.4 µm or less.

Next, a conductive paste for internal electrodes may be applied on the ceramic green sheet to form an internal electrode pattern. The internal electrode pattern may be formed by a screen printing method or a gravure printing method.

The conductive paste for the internal electrodes may include a conductive metal and an additive, and the additive may be any one or more of nonmetals and metal oxides.

The conductive metal may include nickel. The additive may include barium titanate or strontium titanate as the metal oxide.

The thickness of the internal electrode pattern may be 0.5 µm or less, and thus, the thickness of the internal electrode after firing may be 0.41 µm or less.

Thereafter, the ceramic green sheets on which the internal electrode pattern is formed may be stacked, pressed from a lamination direction, and compressed. As a result, a ceramic laminate on which internal electrode patterns are formed may be prepared.

Next, the ceramic laminate may be cut and chipped for each region corresponding to one capacitor.

In this case, one end of the internal electrode pattern may be cut to be alternately exposed through a side surface thereof.

Thereafter, the chipped laminate may be fired to prepare a ceramic body including a dielectric layer and an internal electrode.

The firing process may be carried out in a reducing atmosphere. In addition, the firing process may be carried out by adjusting a temperature increase rate, but is not limited thereto. The temperature increase rate may be 30° C./60 s to 50° C./60 s at 700° C. or lower.

According to an exemplary embodiment of the present disclosure, the ratio ($\sigma te/td$) of the standard deviation of thicknesses of the internal electrode to the thickness of the dielectric layer is adjusted to satisfy $0.12 \leq \sigma te/td \leq 0.21$, such that moisture resistance reliability can be enhanced due to an increase of chip strength and a multilayer ceramic electronic component having excellent withstand voltage resistance characteristics can be obtained.

Next, an external electrode may be formed to cover a side surface of the ceramic body and to be electrically connected to the internal electrode exposed to the side surface of the ceramic body. Thereafter, a plating layer such as nickel, tin, or the like may be formed on a surface of the external electrode.

Hereinafter, the present disclosure will be described in detail with reference to Examples and Comparative Examples.

Multilayer ceramic capacitors according to Examples and Comparative Examples were prepared according to the following method.

Barium titanate powder, ethanol as an organic solvent, and polyvinyl butyral as a binder were mixed, ball milled to prepare a ceramic slurry, and a ceramic green sheet was prepared using the same.

Conductive paste containing nickel was printed on the ceramic green sheet to form internal electrodes, and a green laminate formed by stacking the internal electrodes was subjected to isostatic pressing at a pressure of 1,000 kgf/cm² at 85° C.

After cutting the compressed green laminate to prepare a green chip, and the green chip was subjected to a debinding process for maintaining the cut green chip at 230° C. for 60 hours under an air atmosphere, the green chip was sintered at 1000° C. to prepare a sintered chip. Sintering was carried out under a reducing atmosphere to prevent oxidation of the internal electrodes, and the reducing atmosphere was set to $10^{-11}$ to $10^{-10}$ atm, lower than Ni/NiO equilibrium oxygen partial pressure.

A paste for external electrodes containing copper powder and glass powder on an outside of the sintered chip was used to form external electrodes, and a nickel plating layer and a tin plating layer were formed on the external electrodes by electroplating.

According to the above method, a multilayer ceramic capacitor having a size of 0603 was prepared. The 0603 size may be 0.6 μm±0.1 μm and 0.3 μm±0.1 μm in length and width, respectively. The characteristics of the multilayer ceramic capacitor were evaluated as follows.

Table 1 compared electrode connectivity according to the average number of conductive metal particles in the thickness direction of the internal electrode pattern and the determination result thereof, according to an exemplary embodiment of the present disclosure.

TABLE 1

| | Ratio($\sigma te/td$) of standard deviation of thickness of internal electrodes to thickness of dielectric layer ($\sigma te/td$) | Chip Strength (%) | Judge reliability (The number of defectives/ The number of samples) | Withstand voltage characteristics |
|---|---|---|---|---|
| 1* | 0.09 | 70 | 4/400 | ⊚ |
| 2 | 0.12 | 80 | 0/400 | ○ |
| 3 | 0.15 | 85 | 0/400 | ○ |
| 4 | 0.18 | 90 | 0/400 | ○ |
| 5 | 0.21 | 95 | 0/400 | ○ |
| 6* | 0.24 | 100 | 0/400 | X |

[Evaluation]
X: Bad, ○: Good, ⊚: Very good
*Comparative Example

Referring to Table 1, Sample 1 is a case in which the ratio ($\sigma te/td$) of the standard deviation of thicknesses of the internal electrodes 121 and 122 to the thickness of the dielectric layer 111 is less than 0.12. According to Sample 1, although the withstand voltage characteristics are excellent, deterioration in moisture resistance reliability may be a problem as chip strength is lowered.

Meanwhile, Sample 6 is a case in which the ratio ($\sigma te/td$) of the standard deviation of thicknesses of the internal electrodes 121 and 122 to the thickness of the dielectric layer 111 exceeds 0.21. According to Sample 6, the chip strength is high, so the moisture resistance reliability may not be a problem, but the withstand voltage characteristics are deteriorated, so reliability may be a problem.

On the other hand, Samples 2 to 5 are cases in which a numerical range of the present disclosure is satisfied, and the ratio ($\sigma te/td$) of the standard deviation of thicknesses of the internal electrode to the thickness of the dielectric layer is adjusted to satisfy $0.12 \leq \sigma te/td \leq 0.21$. Thus, moisture resistance reliability may be improved by increasing the chip strength and a multilayer ceramic electronic component having excellent withstand voltage characteristic may be realized.

As set forth above, according to an exemplary embodiment of the present disclosure, by controlling the ratio ($\sigma te/td$) of the standard deviation of thicknesses of the internal electrode to the thickness of the dielectric layer, moisture resistance reliability is improved by increasing chip strength, and the multilayer ceramic electronic component having excellent withstand voltage characteristics may be implemented.

While exemplary embodiments have been shown and described above, it will be apparent to those skilled in the art that modifications and variations could be made without departing from the scope of the present invention as defined by the appended claims.

What is claimed is:

1. A multilayer ceramic electronic component, comprising a ceramic body including first and second internal electrodes disposed to face each other and a dielectric layer interposed therebetween,
wherein, when an average thickness of the dielectric layer is denoted as 'td,' an average thickness of the first and second internal electrodes is denoted as 'te,' and a standard deviation of thicknesses of an internal electrode, measured at a plurality of points in a predetermined region of the internal electrode, is denoted as '$\sigma te$,' a ratio of the standard deviation of thicknesses of the internal electrode to the average thickness of the dielectric layer, which is denoted as '$\sigma te/td$,' satisfies $0.12 \leq \sigma te/td \leq 0.21$, and wherein the average thickness of the dielectric layer is 0.4 µm or less.

2. The multilayer ceramic electronic component of claim 1, wherein a thickness direction (T) is defined as a direction in which the dielectric layer is interposed between the first and second internal electrodes, and a length direction (L) is a direction perpendicular to the thickness direction, and
wherein the td and the te are average thicknesses of the dielectric layer and the first and second internal electrodes, respectively, in a length-thickness (L-T) direction cross-section cut in a central portion of the ceramic body in a width direction (W), which is a direction perpendicular to the thickness direction and the length direction.

3. The multilayer ceramic electronic component of claim 1, wherein the average thickness of the first and second internal electrodes is 0.41 µm or less.

4. The multilayer ceramic electronic component of claim 1, wherein a thickness direction (T) is defined as a direction in which the dielectric layer is interposed between the first and second internal electrodes, and a length direction (L) is a direction perpendicular to the thickness direction, and
wherein the thicknesses for the σte are measured in at least 10 points of the predetermined region of the internal electrode, having a size of 20 µm×14 µm, in a length-thickness direction (L-T) cross-section of the ceramic body, and the at least 10 points have intervals of 10 nm or less.

5. The multilayer ceramic electronic component of claim 1, further comprising external electrodes disposed on an external surface of the ceramic body.

6. The multilayer ceramic electronic component of claim 5, wherein an average thickness of the external electrodes is in a range of 10 µm to 50 µm.

7. A method of manufacturing a multilayer ceramic electronic component, comprising steps of:
preparing ceramic green sheets each containing ceramic powder;
forming an internal electrode pattern with a conductive paste, containing conductive metal particles, and an additive on each ceramic green sheet;
stacking the ceramic green sheets, on each of which the internal electrode pattern is formed, to form a ceramic laminate; and
firing the ceramic laminate to form a ceramic body, which includes at least one dielectric layer and at least one internal electrode,
wherein, when an average thickness of the at least one dielectric layer is denoted as 'td,' an average thickness of the at least one internal electrode is denoted as 'te,' and a standard deviation of thicknesses of an internal electrode, measured at a plurality of points in a predetermined region of the internal electrode, is denoted as 'σte,' a ratio of the standard deviation of thicknesses of the internal electrode to the average thickness of the dielectric layer, which is denoted as 'σte/td,' satisfies $0.12 \leq \sigma te/td \leq 0.21$, and
wherein the average thickness of the at least one dielectric layer is 0.4 µm or less.

8. The method of manufacturing the multilayer ceramic electronic component of claim 7, wherein a thickness direction (T) is defined as a direction in which the ceramic green sheets are stacked, and a length direction (L) is a direction perpendicular to the thickness direction, and
wherein the td and the te are average thicknesses of the at least one dielectric layer and the at least one internal electrode, respectively, in the length-thickness (L-T) direction cross-section cut in a central portion of the ceramic body in a width direction (W), which is a direction perpendicular to the thickness direction and the length direction.

9. The method of manufacturing the multilayer ceramic electronic component of claim 7, wherein the average thickness of the at least one internal electrode is 0.41 µm or less.

10. The method of manufacturing the multilayer ceramic electronic component of claim 7, wherein a thickness direction (T) is defined as a direction in which the ceramic green sheets are stacked, and a length direction (L) is a direction perpendicular to the thickness direction, and
wherein the thicknesses for the σte are measured in at least 10 points of the predetermined region of the internal electrode, having a size of 20 µm×14 µm, in a length-thickness direction (L-T) cross-section of the ceramic body, and the at least 10 points have intervals of 10 nm or less.

\* \* \* \* \*